United States Patent Office 3,152,246
Patented Oct. 6, 1964

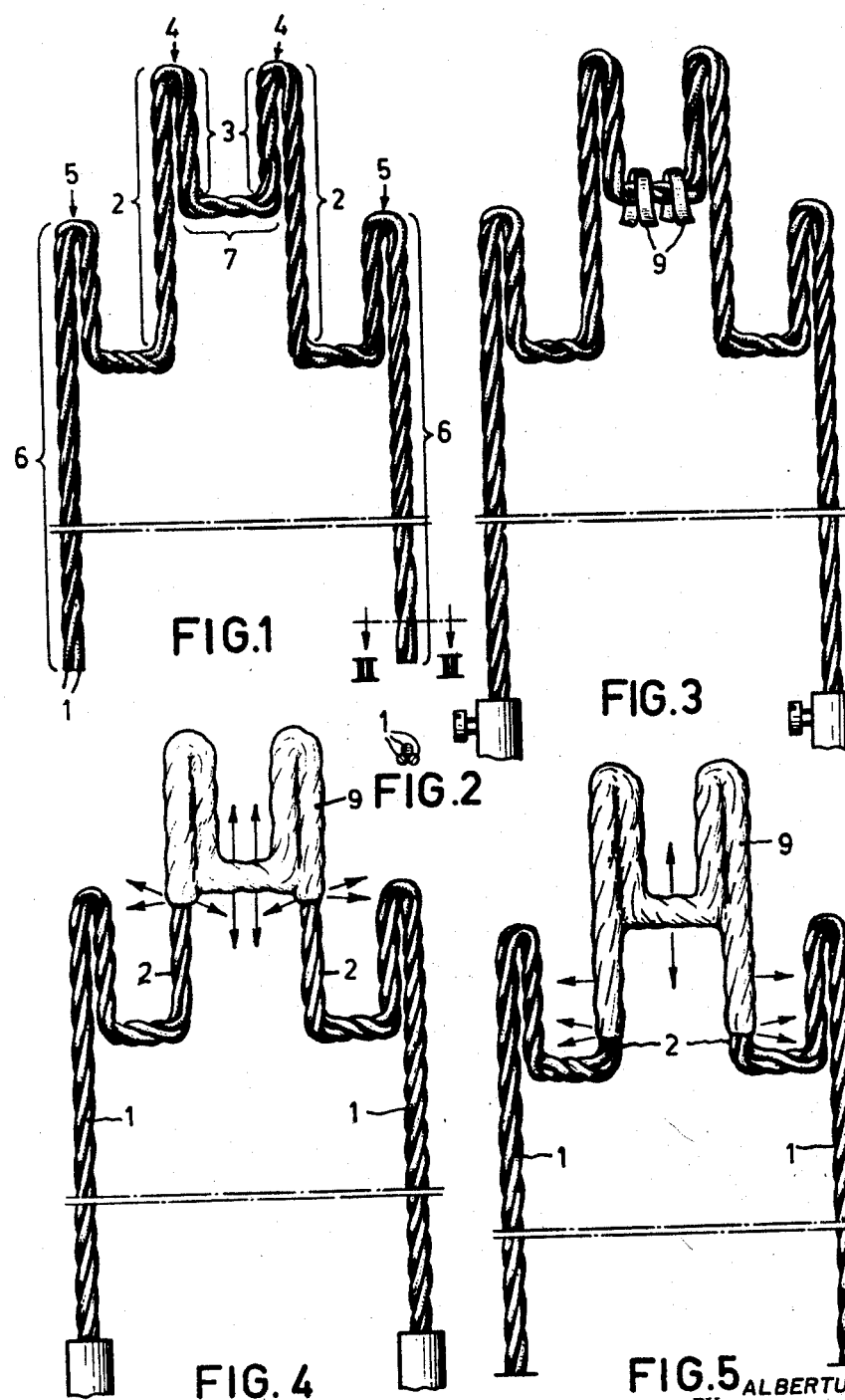

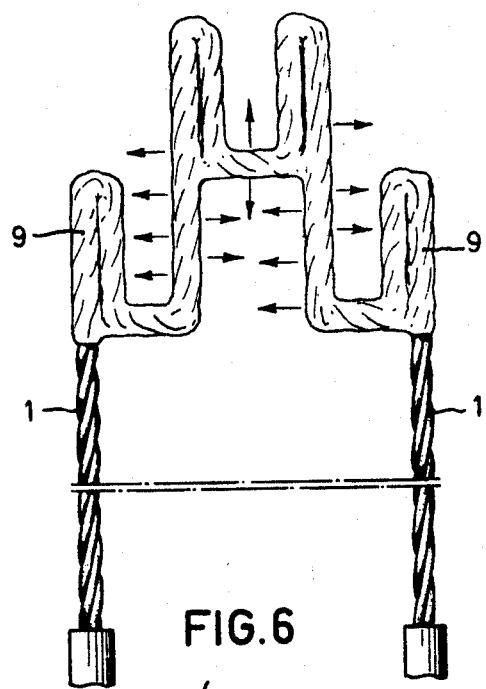
FIG. 6
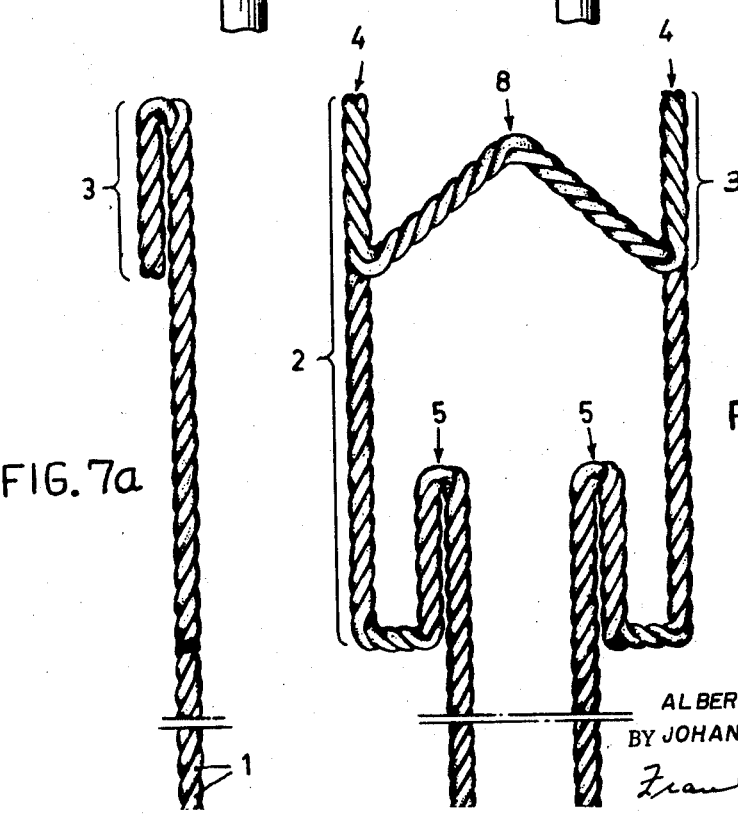
FIG. 7a
FIG. 7b

3,152,246
DEVICE FOR DEPOSITING METAL LAYERS FROM VAPOUR IN VACUO
Albertus Johannes van Deuren and Johannes Gerardus Marsmans, Eindhoven, Netherlands, assignors to North American Philips Company, Inc., New York, N.Y., a corporation of Delaware
Filed Mar. 2, 1961, Ser. No. 92,949
Claims priority, application Netherlands Mar. 24, 1960
6 Claims. (Cl. 219—553)

This invention relates to a device for depositing metal layers from vapour in vacuo and in particular for covering a rectangular luminescent screen of a cathode ray tube with a thin aluminum layer.

It has appeared that it is not easy to provide a rectangular screen with a metal layer of even thickness. Already many forms of incandescent members for heating the metal to be evaporated are known. It is known, for example, to cover the screen of a cathode ray tube with a metal layer by evaporating aluminum from a basket-shaped heating element. The heating wire has the form of a conical coil in which the melted aluminum drop is kept by capillary forces during evaporation. In addition, for metallising incandescent lamp envelopes, helical or spiral incandescent members are used.

It appears that with the use of these known forms, the metal layer above the heating element becomes thickest and that the thickness rapidly decreases towards the edges of the screen. Especially in the corners of a rectangular screen, the thickness of the metal layer becomes only approximately one third of that in the center of the screen. This holds in particular for cathode ray tubes operating with large deflection angles (more than 90°) since in this case the distance from the screen to the neck of the tube is smaller and the heating element has to be provided closer to the screen.

After many investigations it has appeared that the said drawbacks can considerably be decreased in a device for depositing a metal from vapour in vacuo on a rectangular screen of a cathode ray tube, the envelope of the tube being mounted in a vertical position with the screen at the top end and a filament-shaped heating member containing the metal to be evaporated being provided in the tube, if, according to the invention, the heating member has at least one straight vertically arranged part which at least at its upper end is bent back parallel to itself through a part of its length, the space between the vertical part and the bent part being filled with the metal to be evaporated which flows down along the vertical part during evaporation. In order to prevent that metal to be evaporated being possibly present in excess, which may touch the terminal of the heating wire when flowing down, the vertical straight part is at its lower end connected to the terminal via an S-shaped bent part. The excess of liquid metal is retained by this S-shaped part. Because the upper bend of the S, and also the bent part of the heating member, is made as sharp as possible, the liquid metal fills the space between the wire parts connected by the bend, as a result of which these parts are electrically short-circuited and consequently obtain a lower temperature. As a result the liquid metal is retained on this spot. At the upper end of the straight part, the metal retained by the bend serves as a storage vessel, the S-shaped bent lower part then operating as a vessel for receiving the excess of liquid metal.

Preferably, two straight vertical parts are used, of which the upper bent parts are interconnected, for example by a horizontal wire part. A more even layer thickness, particularly in the center of the screen, may be obtained, however, if the connecting part of the bent wire parts has the form of an inverted V.

The heating member preferably consists of plural, for example three, wires which are twisted, i.e., a strand of wires so that the liquid metal to be evaporated flows along these wires by capillary action.

In order that the invention may be readily carried into effect, it will now be described, by way of example, with reference to the accompanying drawings, in which:

FIGURE 1 shows a heating member according to the invention,

FIGURE 2 shows a sectional view of this heating member, and

FIGURES 3, 4, 5 and 6 show how the metal to be evaporated, flows along the heating member during the evaporation process, FIGURES 7a and 7b are side and front views, respectively, of another embodiment according to the invention.

Figure 8:
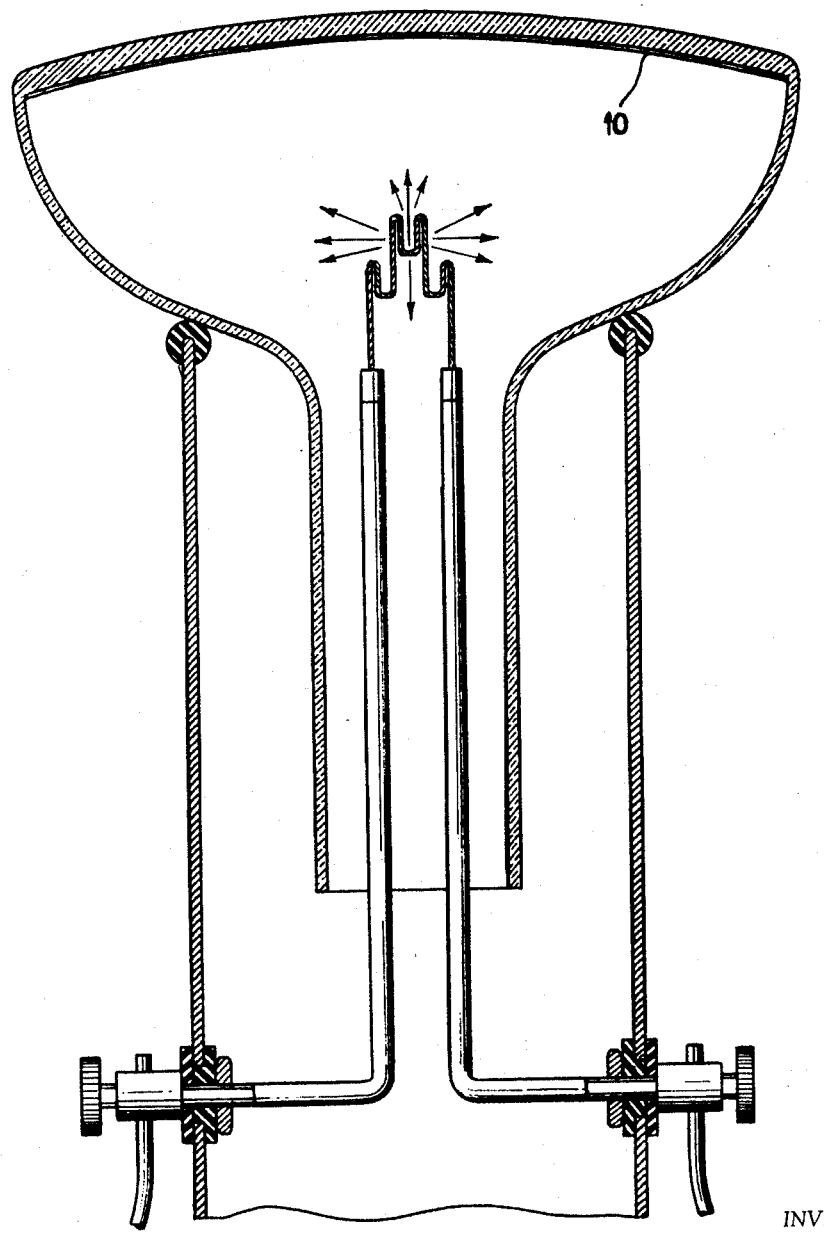

FIGURE 8 diagrammatically shows the device according to the invention.

In FIGURE 1, the heating member is built up of 3 tungsten wires 1 each having a diameter of 0.6 mm. and wound one into the other or twisted together to form a stranded wire. The cross-section is shown in FIGURE 2.

The heating member as shown in FIGURE 1 has two vertical straight parts 2 which are bent back at the upper end with a sharp bend 4 through a distance 3 and parallel to itself. The two bent parts 3 are interconnected by a horizontal part 7.

At the lower end, the straight parts 2 are connected to the supply conductors 6 via S-shaped parts. In general, the parts 6, 2, 3 and 7 are formed as a unit.

The metal to be evaporated, for example aluminum, is hung over the part 7 in the shape of riders 9 (FIGURE 3). After the heating element has been provided in the envelope of the cathode ray tube as shown in FIGURE 8, and the envelope has been evacuated, the heating element is heated, so that the mteal 9 melts and flows along the wires 1 via a part 7 to parts 2 and 3, filling the space between the bent part 3 and the vertical straight part 2. Because the bend 4 is now short-circuited, the temperature decreases here, while that of the remaining part of the parts 2 increases (FIGURE 4). As a specific example, for illustrative purposes only, the heating member of FIGS. 1 to 6, has the following dimensions. The total height of the body, as far as it protrudes from the terminals, is about 47 mm. The parts 6 protrude each 40 mm. from the terminals, the parts 2 are 16 mm. each long, the parts 3 are 7 mm. each long, the part 7 is 4 mm. long, and the gaps between the parts bent back at 4 and 5 are about 1 mm. each. The other horizontal parts have a total length of 3 mm. each. The total width is 17 mm. A heating current of about 80 amps at about 6 volts is switched on. Now the metal 9 turns out to evaporate substantially along the boundary plane of this metal and the part 2 as shown by the arrows in FIGURES 4–6. Alsod the part 7 becomes hotter than the short-circuited bends 4 so that at 7 also evaporation occurs, as a result of which substantially the center of the screen 10 (FIGURE 8) is covered more evenly. It appears that the vapour evaporating from the vertical parts 2 precipitates as a sufficiently thick layer even as far as the corners of the rectangular screen 10. It appears that the thickness of the layers in the corners of the screen 10 may even be thicker than in the center. It has even appeared to be necessary in most cases to enlarge the length of part 7 and to shape this part as an inverted V, as indicated by 8 in FIGURE 7, so as to make the layer sufficiently thick in the center of the screen. A very even distribution of metal is obtained if the bends 4 at the upper ends of the vertical wire parts 2 are at right angles to the bends at the lower ends hereof. In the known embodiment of the heating members, using loops and spirals, it appears that the layer thickness in the corners may become at most 30 to 35% of that in the center of the screen.

As shown in FIGURE 5, the metal 9 flows downwards along the vertical parts 2 and is finally caught by the sharp bends 5 of the S-shaped bent part, so that it does not flow farther along the parts 6 since then the layer thickness is already sufficient and heating may be stopped. It appears that a layer thickness of 125 millimicrons may be obtained in approximately 1–2 minutes. The switching off of the heating occurs when the layer thickness has obtained the right value.

Although in the figures only heating members are shown having two vertical straight parts for the evaporation, it is also possible to use only one vertical part or more than two parts. It has proved, however, that shapes in which for example loops and spiral parts are provided in the heating member always yield a more uneven distribution of the layer thickness on the screen.

What is claimed is:

1. A filament adapted for vaporizing metal provided thereon, comprising an elongated electrically conductive stranded wire element having extremities for connection to current-supply terminals and between the extremities at least two, substantially straight, spaced vertical portions each joined at its upper end in a sharp bend to a reversely-bent portion extending substantially parallel to the adjacent vertical portion and spaced therefrom a small distance at which the intervening space becomes filled with molten metal when the filament is energized during the vaporization, and a generally transverse portion connecting together the lower ends of the two reversely-bent portions.

2. A filament as set forth in claim 1 wherein the transverse portion has the shape of an inverted V.

3. A filament as set forth in claim 1 wherein a substantially S-shaped portion connects the lower end of each vertical portion to one of the current supply terminals, said S-shaped portions each including a further vertical portion whose upper end is joined in a sharp bend to a reversely-bent portion.

4. A filament as set forth in claim 3 wherein the reversely-bent wire portion connected to the upper end of each said vertical portion extends at right angles to the said wire portion connected to the said lower end of each vertical portion.

5. A filament for vaporizing metal provided thereon, comprising an elongated, electrically conductive, stranded wire element having extremities for connection to current-supply terminals and between the extremities at least four, substantially straight, vertical portions each joined at its upper end in a sharp bend to a reversely-bent portion extending substantially parallel thereto and spaced therefrom such a small distance that the intervening space becomes filled with molten metal during the vaporization thereof, a first generally transverse portion connecting together the lower ends of the reversely-bent portions connected to the two middle vertical portions, and second and third generally transverse portions connecting together the lower ends of the middle vertical portions and the lower ends of the reversely-bent portions connected to the two end vertical portions.

6. A filament as set forth in claim 5 wherein the first transverse portion lies substantially above the second and third transverse portions.

References Cited in the file of this patent

UNITED STATES PATENTS 2,569,852      Green  ---------------- Oct. 2, 1951

FOREIGN PATENTS 1,165,496      France  ---------------- June 2, 1958

OTHER REFERENCES

Holland: Vacuum Deposition of Thin Films, New York, John Wiley & Sons Inc., 1956, p. 115.